Patented Aug. 19, 1924.

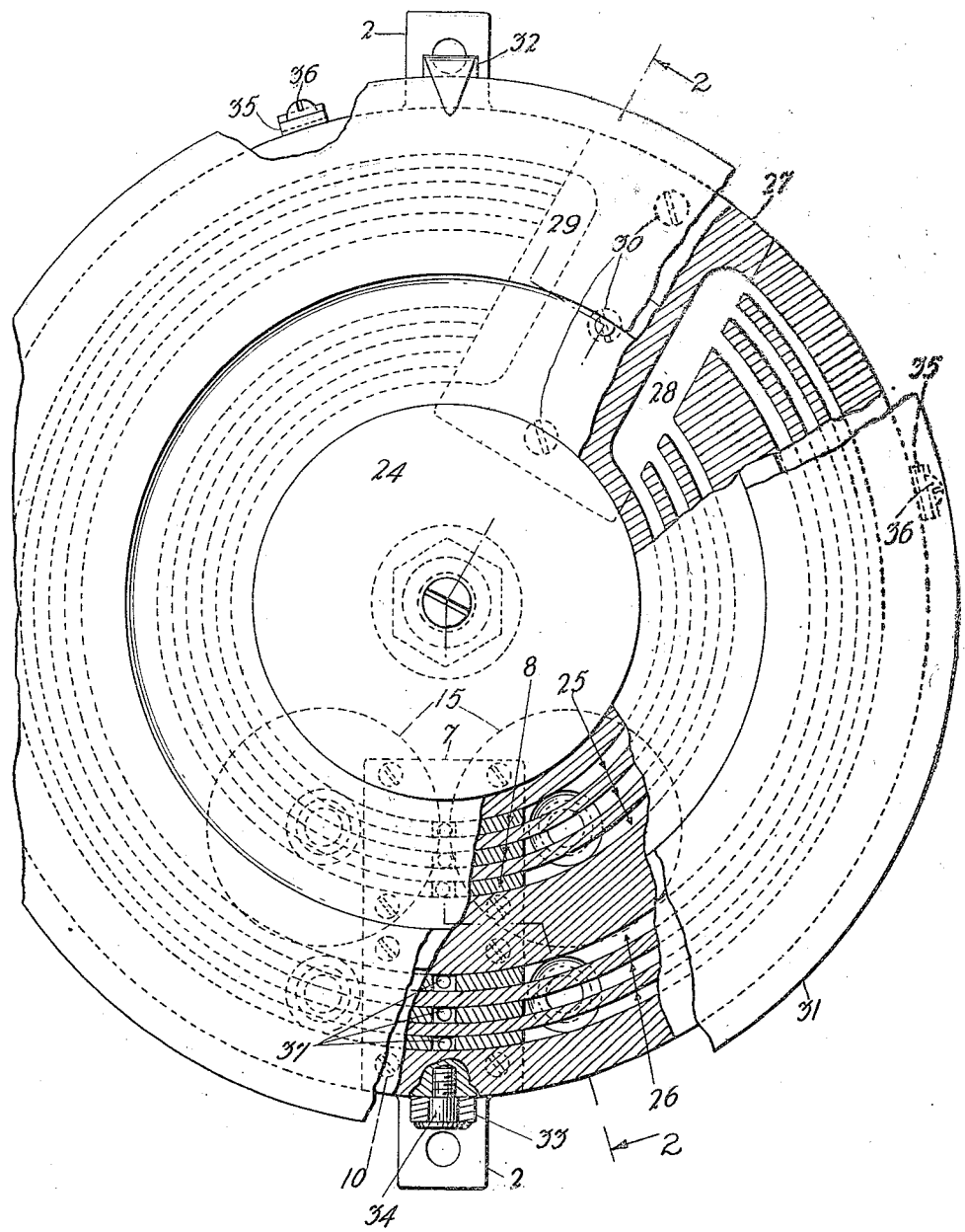

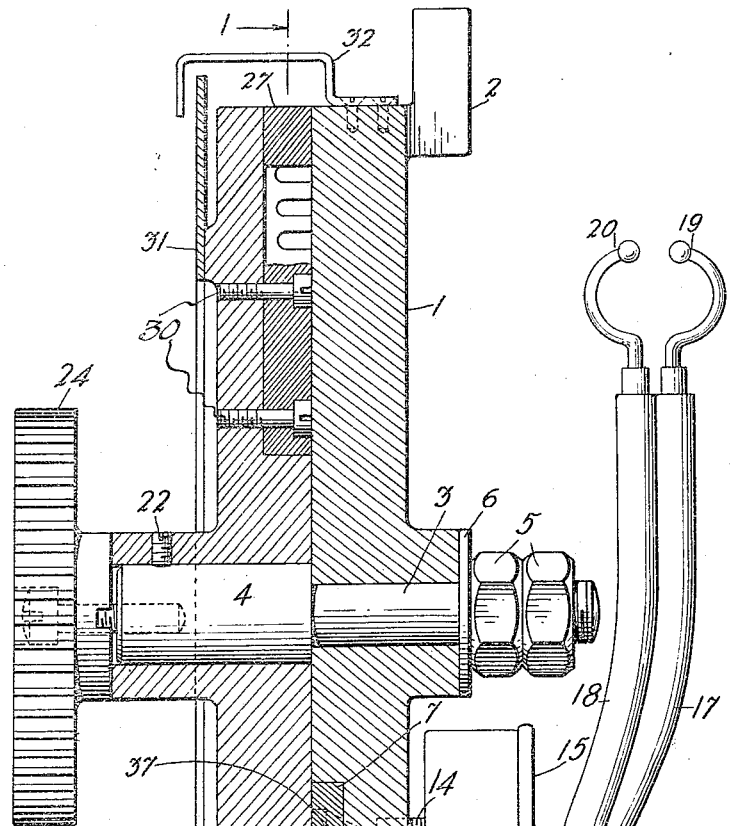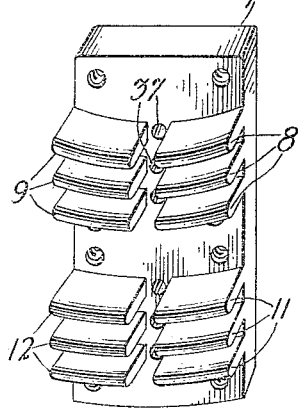

1,505,481

UNITED STATES PATENT OFFICE.

CHARLES R. MOORE, OF WYOMING, NEW JERSEY, ASSIGNOR TO WESTERN ELECTRIC COMPANY, INCORPORATED, OF NEW YORK, N. Y., A CORPORATION OF NEW YORK.

ACOUSTICAL DEVICE.

Application filed July 28, 1919. Serial No. 313,729.

*To all whom it may concern:*

Be it known that I, CHARLES R. MOORE, a citizen of the United States, residing at Wyoming, in the county of Essex and State of New Jersey, have invented certain new and useful Improvements in Acoustical Devices, of which the following is a full, clear, concise, and exact description.

This invention relates to acoustical devices and more particularly to devices of this character employed in the binaural method of observing and locating sources of vibrations.

In such methods it is the usual practice to employ a pair of relatively fixed devices for converting the vibrations into observable effects, and by means of a device known as a compensator, to introduce independent air paths between the converting devices and the respective ears of an observer. By the proper relative adjustment of the lengths of the two air paths the difference in the time of arrival at each of the affected devices of vibrations propagated from the source under observation may be compensated for, so that a binaural balance may be obtained. In other words, the observer receives an impression that the source is directly ahead when listening binaurally to the observable effects. The angular relation of the source to a base line joining the vibration responsive members of the converting devices may then be determined from an indicating means associated with the compensator which indicates the relation between the effective lengths of the adjustable air paths.

Since the effects of resonance in an acoustical device of this nature may materially interfere with the accuracy of the observation which may be made following the above mentioned method, it is desirable to reduce such effects to a minimum.

It is an object of this invention to provide an improved compensating device of this character in which the effects of resonance are substantially suppressed.

To attain this object in accordance with one feature of the invention, the walls enclosing the air paths of a compensator are so formed as to provide a maximum amount of surface friction to the passage of sound waves over the paths consistent with the section required for maintaining the desired efficiency of the transmission of vibrations therethrough, thereby reducing the resonance to a minimum. More specifically, the sound vibrations are transmitted through a plurality of parallel paths, the total effective transmitting cross-section of such paths being substantially that of a single path required to give the desired volume of transmission.

A further feature of the invention resides in the provision of means to effectively prevent the passage to the ears of the observer of minor resonant effects which may be produced within the device. In order to accomplish this result, means is included in the exit of the sound paths from the device to abnormally increase the resistance to the passage of the vibrations. More specifically, a plate of thin metal or other suitable material loosely rolled to form a spiral member is inserted within each outlet member of the device so that the sound waves are transmitted through the convolutions of the spiral member, thus being subjected to an abnormal increase in friction.

These and other features of the invention not specifically mentioned above will more clearly appear from the following specification and the annexed drawing, Figs. 1 and 2 of which show a top plan view, partially in section, and a sectional view, respectively, of a compensator embodying the invention, while Fig. 3 shows a plan view of an outlet member including a spiral member and Fig. 4 shows an enlarged perspective of the stop members used in the compensator.

In the drawings a stationary lower plate member 1 of suitable metal is adapted to be secured to the under side of a suitable table top, not shown, by means of screws extending through diametrically opposite lugs 2. A vertical shaft 3 formed with an enlarged portion 4, providing a shoulder which bears against the upper surface of plate 1, passes through a journal provided in the plate member 1 and is secured in position by means of nuts 5—5 and a washer 6. A base 7, shown in detail in Fig. 4, is suitably mounted in the member 1 by means of screws 10 so that the upper surface thereof is substantially flush with the upper surface of the plate 1. A plurality of pairs of separated stop members 8—9 and 11—12 arranged in groups, one set comprising the pairs 8—9 and the other set comprising the pairs 11—12 project upwardly from the base 7. An aperture 13 through the plate 1 cooperates with an aligned aperture 37 through the base 7 to provide an air path at atmospheric pressure to the space between the separated stop members of each pair. At either side of the base 7 and adjacent the stop members 8 and 9 respectively, a suitable aperture is provided through the plate 1, the upper end of such aperture being of the proper diameter to extend across the ends of the adjacent stop members and the lower end being threaded for the reception of a rigid tube 14 to which is attached a telephone receiver 15. These receivers are not shown in detail since their exact structure is not essential to a complete understanding of the invention, any ordinary enclosed type of receiver being suitable, the tubes 14 being so located in the casings thereof that they convey the sounds produced by the receivers in response to the variations in the electrical conditions of associated circuits.

At either side of the base 7 and adjacent the stop members 11—12, similar apertures through the plate member 1 are provided, the lower ends, however, being equipped with suitable screw bushings 16 for the attachment of the equal length tubes 17 and 18, preferably of rubber, leading to stethoscopic ear pieces 19 and 20 respectively. A spiral member 21 formed by loosely rolling a plate of thin metal is inserted into each of the screw bushings 16. Attached to the enlarged portion 4 of the shaft 3 by means of a set screw 22 so that it rotates with the shaft, is an upper plate member 23, the lower surface of which is in contact relation with the upper surface of the lower plate member 1. A suitable knurled knob or handle 24 attached to the shaft 3 by means of a screw threaded into the upper end thereof provides means for rotating the shaft 3 and the member 23 carried thereby. A set of concentric narrow grooves 25 are provided in the lower surface of the upper plate member 23 so located as to be engaged by the stop members 8 and 9 and a second set of similar grooves 26 are also provided in such surface to be engaged by the stop members 11 and 12. An insert member 27, embedded in the lower surface of the upper plate member 23 so that its surface is flush with the lower surface of such plate and attached thereto by means of screws 30, is provided with recesses 28 and 29. Each of these recesses forms a common path joining the grooves 26 and 25. A scale member 31 suitably attached to and carried by the upper plate member 23 may be suitably graduated so that its position with relation to the fixedly positioned index member 32, suitably attached to the edge of lower plate 1, indicates the angular relation of the two contacting plate members 1 and 23. The arrangement of the scale has been omitted since it is unessential to a proper understanding of the invention. A fixed stop member 33 attached to the edge of the lower plate member 1 by a screw 34 threaded into such plate cooperates with suitably positioned lugs 35 attached to the upper plate member 23 by screws 36, and depending therefrom to limit the amount of rotation of the upper plate member in either direction.

In operation, the sounds or other observable effects produced by one telephonic receiver 15 are conveyed through the associated rigid tube 14, the grooves 25 in multiple, the common recess 28 in the member 27, the grooves 26 in multiple, one bushing member 16 including the spiral member 21, and the rubber tube 17 to the stethoscopic ear piece 19, while the sounds produced by the other receiver 15 are conveyed through the other rigid tube 14, the grooves 25 in multiple, the common recess 29 in the other side of the member 27, the grooves 26 in multiple and through the other bushing member including the other spiral member 21, and the rubber tube 18 to the ear piece 20. When the shaft 3 is rotated by means of a handle 24, the movement of the member 27 decreases the total length of one of the paths just traced simultaneously with a similar increase in the length of the other path. The observer listening binaurally to the sounds emanating from the earpieces 19 and 20 simultaneously receives the sounds produced by the two receivers 15. The handle 24 is then rotated until the impression is received that the source of sound is straight ahead and the reading on the scale 31, indicated by the index 32, indicates the relative lengths of the air paths interposed between the receivers and the respective ears of the observer.

The apertures 13 and 37 between the individual stop members insure that the spaces therebetween are maintained at atmospheric pressure to eliminate the cross talk between the adjacent ends of the grooves 27 and 26 respectively which might otherwise occur due to differences of pressure in the two paths.

It has been found by experimentation that the resonance of acoustical paths is materially suppressed by increasing the so-called skin friction of the enclosing walls to the passage of the sound waves and the arrangement of multiple grooves, as shown, provides a maximum amount of such friction for a given effective cross-section of path, thereby minimizing the resonant effects produced in the compensator. However, in order to suppress the minor resonant effects which may be produced therein, under some conditions the spiral members 21 inserted in the bushings 16, which members provide an abnormally increased wall surface for a short distance in the air path, effectually prevent the escape of such effects to the tubes 17 and 18 leading to the ear pieces 19 and 20.

It will be evident that with a compensator embodying the invention, the production of interfering resonant effects is minimized and such minor effects as may be produced are effectually prevented from reaching the ears of the observer.

What is claimed is:

1. An acoustical device comprising a wall, a plurality of groups of multiply arranged channels formed therein, means to close the open sides of the channels, means to serially interconnect the groups, and means sliding in such channels to vary the effective lengths thereof.

2. An acoustical device comprising an acoustic path, and means comprising a plurality of non-vibrating walls subdividing portions of the path into independent multiply connected sound paths to suppress resonance, means to divide said path into two separate paths, and means to simultaneously vary the length of said separate paths in inverse ratio with respect to each other.

3. An acoustical compensator comprising two circular sound conduits, each of which comprises a group of channels in multiple, means to serially connect the ends of said conduits to form a single path, and means to adjustably subdivide said path into two separate paths.

4. In an acoustical device, a fixedly positioned plate member, a shaft rotatably supported thereby, a movable plate member carried thereby and having a plurality of concentric grooves formed in one surface thereof being in contact relation with one surface of the fixedly positioned plate member and said grooves being arranged in groups, an insert member carried by the movable plate member having common passageways therein interconnecting the groups of grooves, a pair of separated stop members attached to the fixedly positioned plate member and slidably engaging each groove, sound producing devices supported by the fixedly positioned plate member adjacent either side of the pairs of the stop members of one group and acoustically connected with the grooves of the corresponding group, stethoscopic tubes supported by the fixedly positioned plate member adjacent either side of the pairs of stop members of another group and acoustically connected with the grooves of such group, and means for rotating the shaft to vary the angular relation of the insert member, thereby simultaneously causing an inverse and equal variation in the lengths of the ear paths from the receivers through the interconnected portions of the groups of grooves to the associated stethoscopic tubes.

5. An acoustical compensator comprising two acoustical conducting paths, means for simultaneously and inversely varying the length of said paths, a pair of stethoscopic tubes, two other acoustical conduits connecting said paths with said stethoscopic tubes, means within said conduits to prevent the passage therethrough of resonant effects, such means comprising a member inserted in each of said conduits and having a spiral cross-section.

6. An acoustical device provided with a plurality of independent acoustic paths. each path comprising a plurality of multiple paths and a common path, and means to inversely vary the lengths of the independent paths by varying the lengths of the multiple paths thereof.

7. An acoustical device comprising a sound conduit subdivided by a plurality of non-vibrating partitions extending along the length of said conduit, means to divide said conduit into two separate paths and means to simultaneously vary the length of said paths in inverse ratio with respect to each other.

8. An acoustical device comprising a sound conduit having non-resonant means included therein to increase the surface presented to sound waves passing therethrough, means to subdivide said sound conduit into two separate paths, means to simultaneously vary the length of said paths in inverse ratio to each other, and means to indicate the angular relation between said paths.

9. An acoustical device comprising a sound conduit having a spiral of sheet material included therein, a second and a third sound conduit in cooperation with means to set up sound waves therein, and means to alter the phase relation of such sound waves.

In witness whereof, I hereunto subscribe my name this 24th day of July, A. D. 1919.

CHARLES R. MOORE.